(12) United States Patent
Bañuls Tobaruela

(10) Patent No.: US 12,060,740 B2
(45) Date of Patent: Aug. 13, 2024

(54) MULTI-POSITION HINGE FOR THE ANGULAR CONNECTION OF TWO CABLE TRAYS

(71) Applicant: BASOR ELECTRIC, S.A., Gandia (ES)

(72) Inventor: Javier Bañuls Tobaruela, Gandia (ES)

(73) Assignee: BASOR ELECTRIC, S.A., Gandia (ES)

( * ) Notice: Subject to any disclaimer, the term of this patent is extended or adjusted under 35 U.S.C. 154(b) by 24 days.

(21) Appl. No.: 17/780,498

(22) PCT Filed: Nov. 6, 2020

(86) PCT No.: PCT/ES2020/070685
§ 371 (c)(1),
(2) Date: May 26, 2022

(87) PCT Pub. No.: WO2021/105534
PCT Pub. Date: Jun. 3, 2021

(65) Prior Publication Data
US 2023/0003063 A1    Jan. 5, 2023

(30) Foreign Application Priority Data
Nov. 28, 2019 (ES) .............................. ES201931960U

(51) Int. Cl.
*E05D 7/12* (2006.01)
*E05D 7/00* (2006.01)
*F16B 5/02* (2006.01)

(52) U.S. Cl.
CPC . *E05D 7/00* (2013.01); *F16B 5/02* (2013.01)

(58) Field of Classification Search
CPC .......... E05D 7/00; E05D 7/0009; E05D 7/08; E05D 7/10; E05D 7/1061; E05D 7/12; E05D 7/128; E05D 5/16; F16B 5/02
See application file for complete search history.

(56) References Cited

U.S. PATENT DOCUMENTS

| 616,952 A * | 1/1899 | Morrison .................. E05D 7/12 16/271 |
| 2,207,836 A * | 7/1940 | Sundell ..................... E05D 7/12 16/256 |

(Continued)

FOREIGN PATENT DOCUMENTS

| EP | 0578459 A1 | 1/1994 |
| EP | 0630093 A1 | 12/1994 |

(Continued)

OTHER PUBLICATIONS

International Search Report for patent application PCT/ES2020/070685 issued by Spanish Patent and Trademark Office and mailed Feb. 12, 2021, official translation provided.

(Continued)

*Primary Examiner* — Chuck Y Mah
(74) *Attorney, Agent, or Firm* — Hassan Abbas Shakir; Shakir Law PLLC

(57) ABSTRACT

A multi-position hinge for the angular connection of two adjacent cable trays, includes a pin that defines a geometric articulation axis, a first member and a second member articulated together around the geometric axis. The first member and second member are each configured to be coupled to a corresponding cable tray. The multi-position hinge Includes two intermediate attachment members. Each of the intermediate attachment members are to be simultaneously coupled to a respective first member and second member and to a respective cable tray Each of the intermediate attachment members includes first coupling means configured to be coupled to a respective articulated element and second coupling means configured to be coupled to a respective cable tray.

5 Claims, 4 Drawing Sheets

(56) References Cited

U.S. PATENT DOCUMENTS

| | | | | |
|---|---|---|---|---|
| 2,369,480 | A | * | 2/1945 | Mills ........................ F16B 2/241 24/561 |
| 2,656,999 | A | | 10/1953 | Frederick, Jr. |
| 3,423,786 | A | * | 1/1969 | Arias, Jr. ................ E05D 7/123 16/382 |
| 3,728,758 | A | * | 4/1973 | Johansen .................. E05D 7/12 16/382 |
| 5,381,920 | A | * | 1/1995 | Lin ...................... B65D 43/166 16/261 |
| 5,564,658 | A | * | 10/1996 | Rinderer ................ H02G 3/263 248/68.1 |
| 6,303,864 | B1 | * | 10/2001 | Johnson ............... H05K 7/1491 174/72 A |
| 6,354,542 | B1 | * | 3/2002 | Meyer ..................... F16L 3/243 248/68.1 |
| 7,454,815 | B2 | * | 11/2008 | Brinkmann ............. E05D 15/24 16/271 |
| 8,573,715 | B1 | * | 11/2013 | Jackman ................ A47K 10/32 49/382 |
| 8,881,893 | B1 | * | 11/2014 | Cheng ..................... A45C 11/04 206/6 |
| 8,935,830 | B2 | * | 1/2015 | Bailey ...................... E05D 5/06 16/382 |
| 2001/0011406 | A1 | * | 8/2001 | Nakamoto ............ E05D 7/0027 16/271 |
| 2009/0084910 | A1 | * | 4/2009 | White .................. H02G 3/0608 248/70 |
| 2016/0077299 | A1 | * | 3/2016 | Tally ..................... G02B 6/4459 385/135 |

FOREIGN PATENT DOCUMENTS

| | | | | |
|---|---|---|---|---|
| ES | 1196339 | U | * 11/2017 | ........... H02G 3/0608 |
| ES | 1205412 | U | * 2/2018 | ........... H02G 3/0608 |
| FR | 2437720 | A | * 5/1980 | ........... H02G 3/0608 |
| FR | 2847394 | A1 | 5/2004 | |
| GB | 2458749 | A | 10/2009 | |
| KR | 101879158 | B1 | 7/2018 | |
| KR | 1958153 | B1 | * 3/2019 | ................ F16B 5/02 |
| KR | 101966591 | B1 | 4/2019 | |

OTHER PUBLICATIONS

Written Opinion by the International Searching Authority for patent application PCT/ES2020/070685 issued by Spanish Patent and Trademark Office and prepared Feb. 8, 2021, official translation provided.

\* cited by examiner

MULTI-POSITION HINGE FOR THE ANGULAR CONNECTION OF TWO CABLE TRAYS

CROSS-REFERENCE TO RELATED APPLICATIONS

This application is a national stage under 35 U.S.C. § 371 of PCT patent application PCT/ES2020/070685 filed on 6 Nov. 2020, which is pending and which is hereby incorporated by reference in its entirety for all purposes. PCT/ES2020/070685 claims priority to Spanish patent application U201931960 filed 28 Nov. 2019, which is hereby incorporated by reference in its entirety for all purposes.

FIELD OF THE INVENTION

The invention is directed to a multi-position hinge for the angular connection of two cable trays.

More specifically, the invention is directed to the development of a connection system based on a multi-position hinge for the angular connection of two cable trays in a horizontal or vertical plane.

BACKGROUND OF THE INVENTION

Connection devices are well known in the state of the art, devices specially configured for the connection of two cable tray sections at a variable angle and provided with a hinge joint, which comprise a pin that defines a geometric articulation axis, a first member and a second member that are rigid and articulated together around said geometric axis by means of said pin.

Nevertheless, the connection devices used only enable articulation in a single plane, either in a horizontal or vertical plane, so that at the production level, the manufacturer may find a problem of stock or lack of supply, depending on the level of demand for one type of hinge or another (vertical and horizontal).

Furthermore, the applicant is currently unaware of an invention that has all the features described in this specification.

DESCRIPTION OF THE INVENTION

The present invention has been developed with the aim of providing a multi-position hinge which is configured as a novelty within the field of application and solves the aforementioned drawbacks, further contributing other additional advantages that will be obvious from the description below.

An object of the present invention is to therefore provide a multi-position hinge for the angular connection of two adjacent cable trays, comprising a pin that defines a geometric articulation axis, a first member and a second member articulated together around said geometric axis, it being foreseen that said first member and second member are each configured to be coupled to a corresponding cable tray. More particularly, it includes two intermediate attachment members, it being foreseen that each of them are to be coupled to a respective articulated element and to a respective tray, wherein each of the intermediate attachment members includes first coupling means configured to be coupled to a respective articulated element and second coupling means configured to be coupled to a respective tray.

Due to these features, a configuration is obtained that enables two adjoining trays to be hinged both in the horizontal plane and in the vertical plane. Moreover, the very operator or assembler can decide in real time whether a hinged connection of trays in the horizontal plane or in the vertical plane is required, and consequently, apply the corresponding parts as appropriate.

Preferably, the intermediate attachment member consists of a body in the shape of an elongated plate.

According to a preferred embodiment of the invention, the first coupling means of the intermediate attachment member comprise housings present at one of the ends thereof, for the insertion of an extension present in the first or second articulated member that includes a clipping retention system.

According to the invention, the extension can have a harpoon-shaped ending.

According to a preferred embodiment of the invention, the second coupling means of the intermediate attachment member consist of a body with at least one through hole configured for the insertion of a screw member.

Thus, the multi-position hinge described represents an innovative structure with structural and constituent features heretofore unknown for its intended purpose, reasons which, taken together with its usefulness, provide it with sufficient grounds for obtaining the requested exclusivity privilege.

It is worth mentioning that the various elements that make up the hinge of the invention can be made of a plastic material, such as PVC, metallic material, or a combination thereof.

Other features and advantages of the multi-position hinge object of the present invention will become apparent from the description of a preferred but not exclusive embodiment illustrated by way of non-limiting example in the attached drawings, in which:

DESCRIPTION OF A PREFERRED EMBODIMENT

Figure 1:
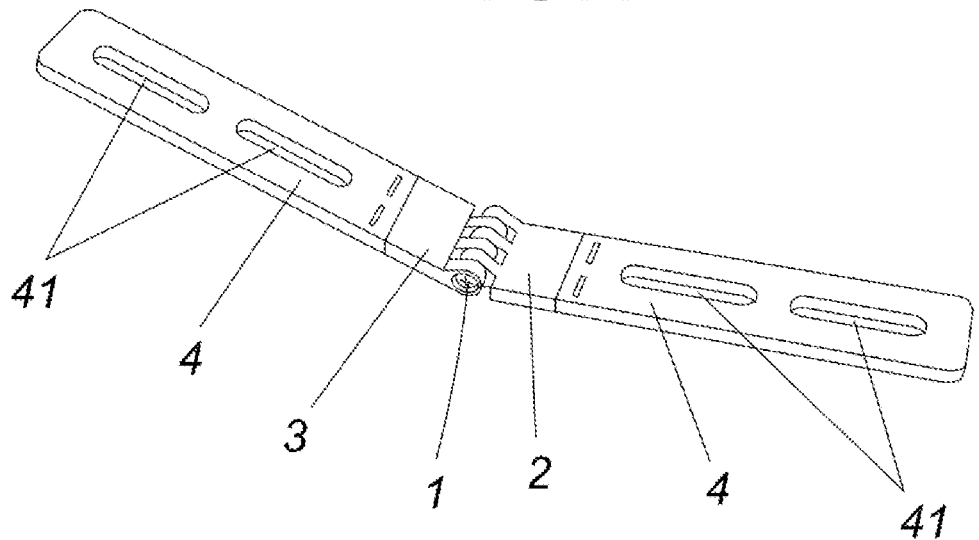
FIG. 1 is a perspective view of a first member and a second member to be articulated together in a horizontal plane.

In light of the aforementioned figures, and in accordance with the adopted numbering, one may observe therein a preferred exemplary embodiment of the invention, which comprises the parts and elements indicated and described in detail below.

Embodiments of the multi-position hinge for the angular connection of two cable trays (100) comprise a pin (1), made, for example, of polymeric material (such as PVC) that defines a geometric articulation axis, a first member (2) and a second member (3) that are articulated together around said geometric axis by means of the pin (1), said first and second members (2, 3) being configured so that each is linked with a tray.

Figure 2:
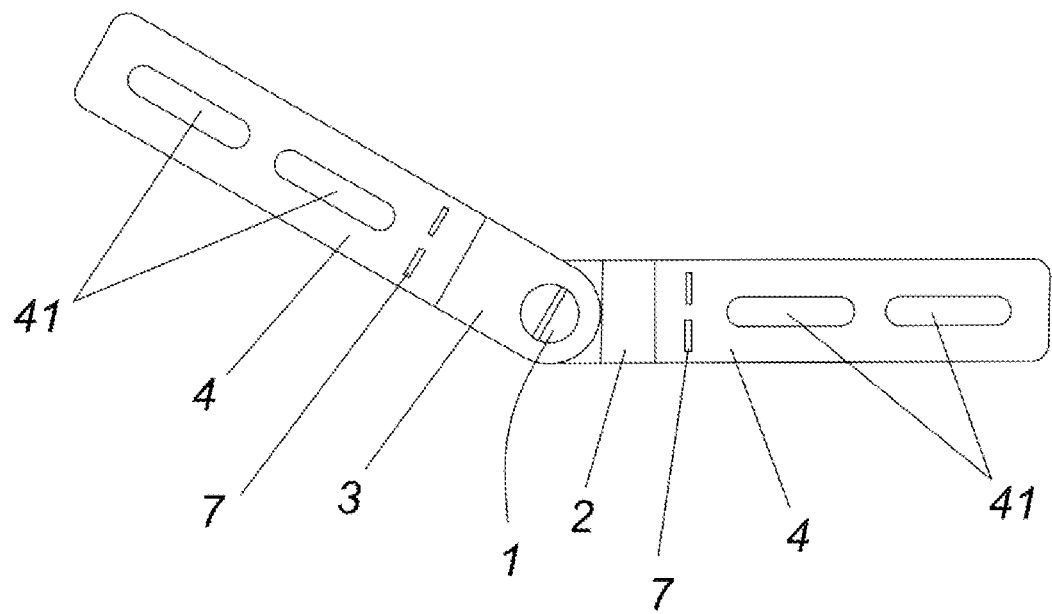
FIG. 2 is a perspective view of another embodiment of a first and second member to be articulated together in a vertical plane.
Figure 3:
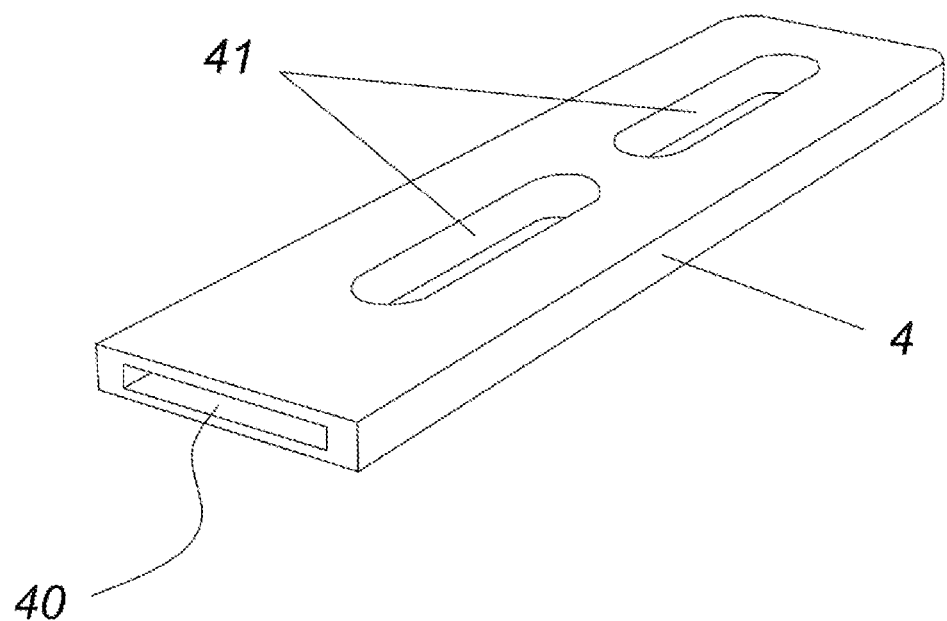
FIG. 3 is an upper perspective view of an intermediate attachment member that forms part of the hinge of the invention.
Figure 4:
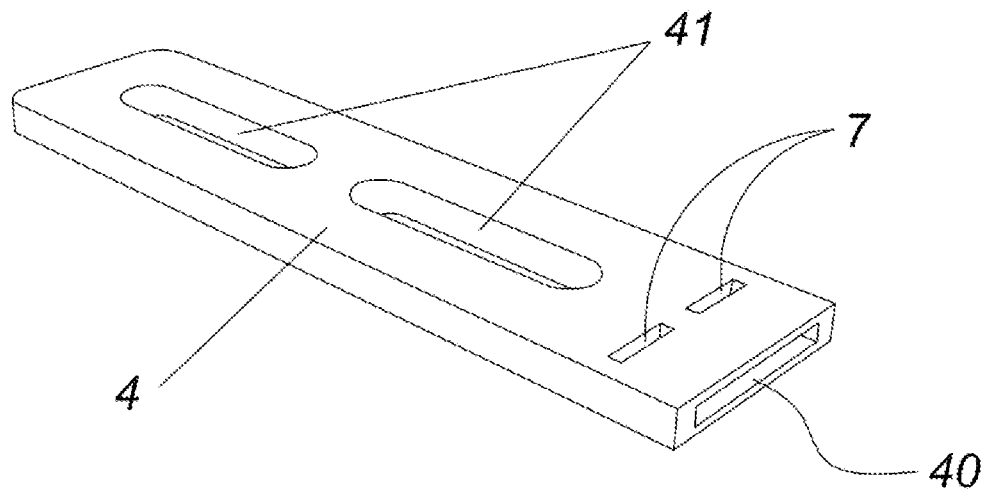
FIG. 4 is a lower perspective view of the intermediate attachment member.
Figure 5:
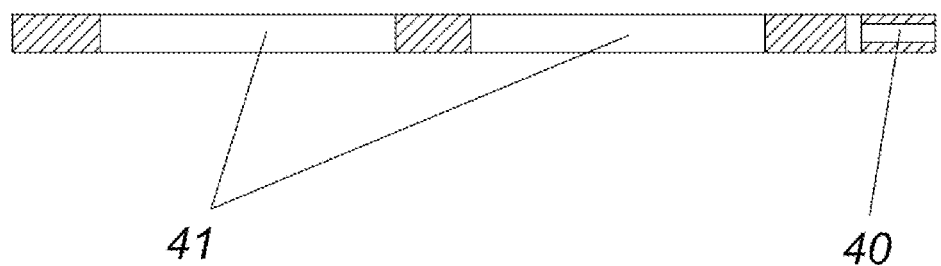
FIG. 5 is a longitudinal cross-sectional view of the intermediate attachment member shown in FIGS. 3 and 4.

It is worth mentioning that FIG. 1 shows a hinge configured for working in a horizontal plane, whereas FIG. 2 shows a hinge configured for working in a vertical plane, the same common portions having the same numerical references.

Figure 7:
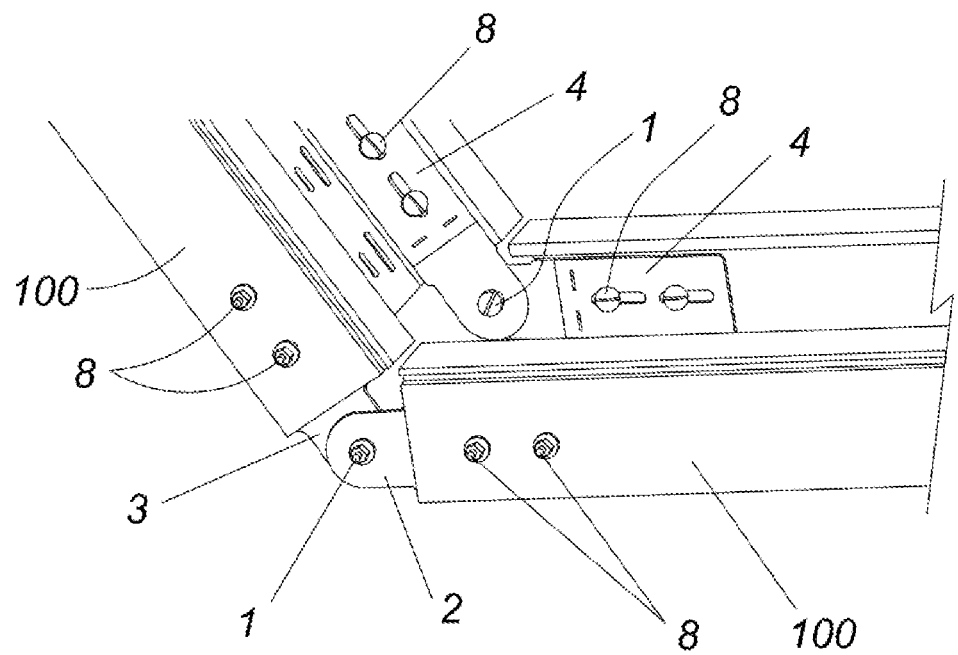
FIG. 7 is a partial perspective view of two cable trays joined together at one of the ends thereof by means of a multi-position hinge like the one shown in FIG. 2.
Figure 8:
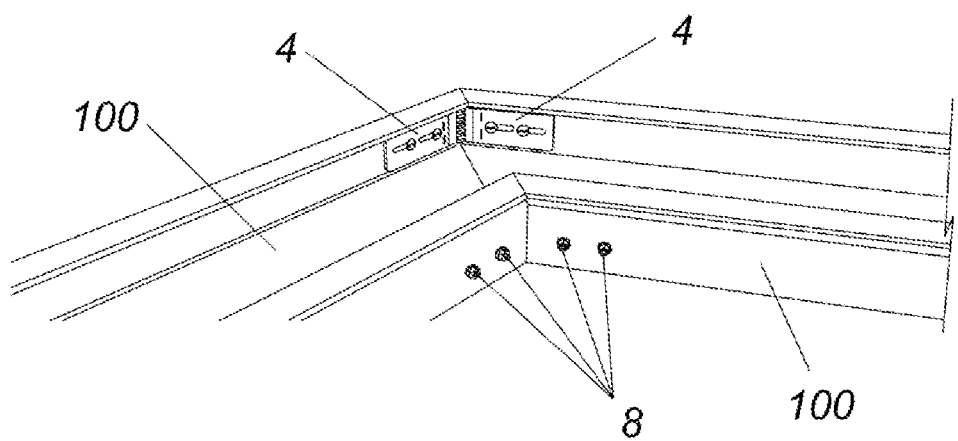
FIG. 8 is a partial perspective view of two cable trays joined together at one of the ends thereof by means of a multi-position hinge like the one shown in FIG. 1.

Furthermore, FIGS. 7 and 8 show two arrangements of cable trays (100) joined together, through a pair of hinges such as those described below, each of them being housed in side walls of each of the cable trays (100).

The multi-position hinge includes two intermediate attachment members (4) that are the same in shape and size, having the shape of an elongated plate, it being foreseen that each of these intermediate attachment members (4) are to be coupled to a respective articulated member (2, 3) and to a respective cable tray (100). Each intermediate attachment member (4) includes first coupling means configured to be coupled to a respective member (2, 3) articulated together and second coupling means configured to be coupled to a respective cable tray (100) that will be explained in more detail later.

Figure 6:
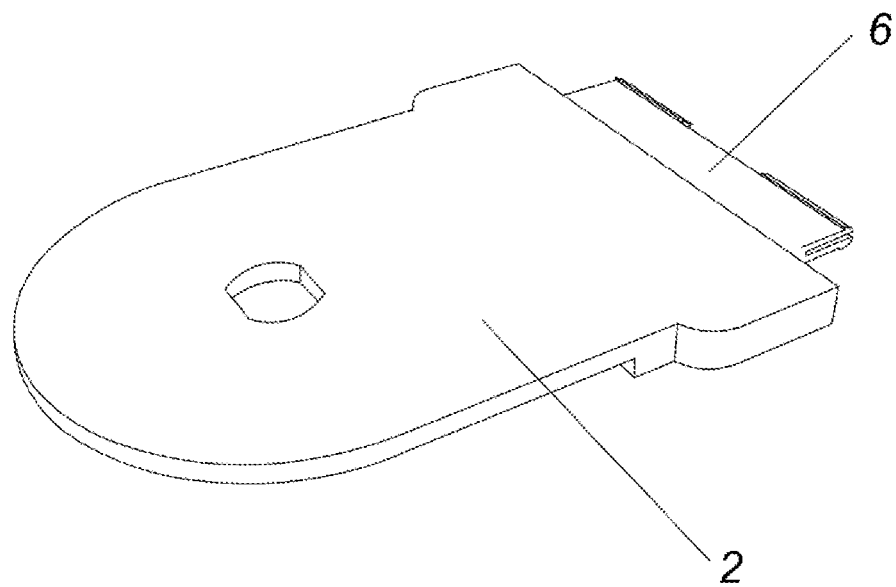
FIG. 6 is a perspective view of an embodiment of a member that forms part of the hinge shown in FIG. 2.

Now, with regard to the aforementioned first coupling means present in intermediate attachment members (4), they essentially comprise a housing (40) present at one of the ends of the body in the shape of a plate configured for the insertion of an extension present in the first or second articulated member (2, 3) that includes a clipping retention system, said extension (6) having a harpoon-shaped ending. This extension (6) having a harpoon-shaped ending that can be seen in FIG. 6 is inserted by pressure into complementary slits (7) that are made, particularly in one of the sides of each intermediate attachment member (4).

With particular reference to the second coupling means present in the intermediate attachment member (4), they consist of a plurality of oblong through holes (41) configured for the insertion of a screw member (8) (see FIGS. 7 and 8), which extend in a longitudinal direction of the intermediate attachment member (4), which enables the position thereof to be adjusted.

The details, shapes, dimensions and other secondary elements, used to manufacture the multi-position hinge of the invention, may be suitably replaced with others that do not depart from the scope defined by the claims included below.

What is claimed is:

1. A multi-position hinge for the angular connection of two adjacent cable trays, the multi-position hinge comprising:
    a pin defining a geometric articulation axis;
    a first articulating member around the geometric axis and a second articulating member articulating around the geometric axis;
    the first articulating member associated with a first cable tray of the two adjacent cable trays and the second articulating member associated with a second cable tray of the two adjacent cable trays;
    a first intermediate attachment member and a second intermediate attachment member;
    a plurality of first coupling means and a plurality of second coupling means;
        the first intermediate attachment member comprising one first coupling means of the plurality of first coupling means and one second coupling means of the plurality of second coupling means, the first intermediate attachment member coupled to the first articulating member by the one first coupling means of the plurality of first coupling means, and the first intermediate attachment member coupled to the first cable tray by the one second coupling means of the plurality of second coupling means;
        the second intermediate attachment member comprising one first coupling means of the plurality of first coupling means and one second coupling means of the plurality of second coupling means, the second intermediate attachment member coupled to the second articulating member by the one first coupling means of the plurality of first coupling means, and the second intermediate attachment member coupled to the second cable tray by the one second coupling means of the plurality of second coupling means;
    wherein each first coupling means of the plurality of first coupling means comprises a housing at an end of the first intermediate attachment element to receive an extension of the first articulating member or at an end of the second intermediate attachment element to receive an extension of the second articulating member, wherein the extension of the first articulating member or the extension of the second articulating member comprises a clipping retention system.

2. The multi-position hinge according to claim 1, wherein the first intermediate attachment member or the second intermediate member consists of a body in a shape of an elongated plate.

3. The multi-position hinge according to claim 1, wherein the extension of the first articulating member or the extension of the second articulating member has a harpoon-shaped ending.

4. The multi-position hinge according to claim 1, wherein the second coupling means of the first intermediate attachment member consists of at least one through-hole configured for an insertion of a screw member.

5. The multi-position hinge according to claim 4, wherein the at least one through-hole is an oblong hole which extends in a longitudinal direction of the first intermediate attachment member.

* * * * *